(12) United States Patent (10) Patent No.: US 11,368,320 B2
Tai (45) Date of Patent: Jun. 21, 2022

(54) MINING MACHINE AND METHOD FOR LIMITING COMPUTING POWER

(71) Applicant: HON HAI PRECISION INDUSTRY CO., LTD., New Taipei (TW)

(72) Inventor: Yuhg-Chang Tai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 277 days.

(21) Appl. No.: 16/872,683

(22) Filed: May 12, 2020

(65) Prior Publication Data

US 2021/0135889 A1 May 6, 2021

(30) Foreign Application Priority Data

Oct. 31, 2019 (CN) .......................... 201911062918.8

(51) Int. Cl.
*H04L 29/06* (2006.01)
*H04L 9/32* (2006.01)
*H04L 9/06* (2006.01)
*G06F 16/903* (2019.01)
*G06F 1/3228* (2019.01)

(52) U.S. Cl.
CPC .......... *H04L 9/3297* (2013.01); *G06F 1/3228* (2013.01); *G06F 16/90344* (2019.01); *H04L 9/0637* (2013.01); *H04L 9/3236* (2013.01); *H04L 2209/38* (2013.01)

(58) Field of Classification Search
CPC ................................ H04L 63/123; H04L 9/30
See application file for complete search history.

(56) References Cited

U.S. PATENT DOCUMENTS

| 2002/0064311 A1* | 5/2002 | Yahagi | G06F 16/902 |
| | | | 707/E17.038 |
| 2011/0085526 A1* | 4/2011 | Joseph | H04M 1/72415 |
| | | | 455/556.1 |
| 2016/0125203 A1* | 5/2016 | Hong | H04L 63/0876 |
| | | | 726/34 |
| 2016/0350751 A1* | 12/2016 | Keys | G06Q 20/3226 |
| 2018/0218027 A1* | 8/2018 | Cronie | G06F 16/2365 |
| 2021/0176058 A1* | 6/2021 | Cheng | G06Q 40/04 |

(Continued)

OTHER PUBLICATIONS

Ghosh et al. "A study on the issue of blockchain energy consumption", the proceedings of International Ethical Hacking Conference 2019, Aug. 2019 (Year: 2019).*

(Continued)

*Primary Examiner* — Taghi T Arani
*Assistant Examiner* — Lin Chang
(74) *Attorney, Agent, or Firm* — ScienBiziP, P.C.

(57) ABSTRACT

A method applied to a mining machine for limiting computing power includes utilizing a dictionary library and a timestamp to control Nonce combination that can be tried per unit time. If all strings in the dictionary library have been tried, as long as a time difference between time of generating most recent timestamp and the current time is less than a preset threshold, the mining machine must wait in sleep state and cannot resume mining until the time difference exceeds the preset threshold. The present disclosure can avoid a situation that the calculation power of the mining machine is too strong and causes a monopoly of the calculation power.

20 Claims, 3 Drawing Sheets

(56) References Cited

U.S. PATENT DOCUMENTS

2021/0263907 A1* 8/2021 Krueger ............... H04L 9/3236
2021/0314143 A1* 10/2021 Conner ................ H04L 9/3239

OTHER PUBLICATIONS

Eyal et al. "Bitcoin-NG—A Scalable Blockchain Protocol", the Proceedings of the 13th USENIX Symposium on Networked Systems Design and Implementation (NSDI '16), Mar. 16-18, 2016 (Year: 2016).*

Milutinovic et al. "proof of luck: an efficient blockchain consensus protocol"; https://arxiv.org/pdf/1703.05435.pdf; Mar. 2017 (Year: 2017).*

* cited by examiner

MINING MACHINE AND METHOD FOR LIMITING COMPUTING POWER

FIELD

The present disclosure relates to blockchain technology field, in particular to a mining machine and a method for limiting computing power of the mining machine.

BACKGROUND

Blockchain relies on miners packing transaction information into blocks and then writing the blocks into the blockchain via mining machines. Each block contains multiple sets of transaction records and a set of Nonce values. Each mining machine generates the Nonce value and calculates a hash value based on the Nonce value. The miner can receive a reward when the mining machine obtains the Nonce value meeting a difficulty requirement.

The blockchain is based on a decentralized design concept which anticipated every mining machine using idle computing resources for mining purposes. However, in pursuit of profit, the miner tries to use a mining machine with best hardware and configuration. For example, the mining machine can be originally configured with a GPU instead of a CPU, and configured with an Application-Specific Integrated Circuit (ASIC) instead of the GPU. Because the mining machine is configured with the ASIC, the mining machine has much more computing power per second, such that computing power is centralized, and a diversity of miners is reduced. The blockchain community continues to adjust a consensus algorithm in order to resist the centralized computing power of mining machines. However, it is still impossible to avoid centralization of the computing power of the mining machine as hardware and configurations of the mining machine are also developing. A method to avoid the computing power of mining machines being too strong and centralized is desired.

DETAILED DESCRIPTION

In order to provide clearer understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
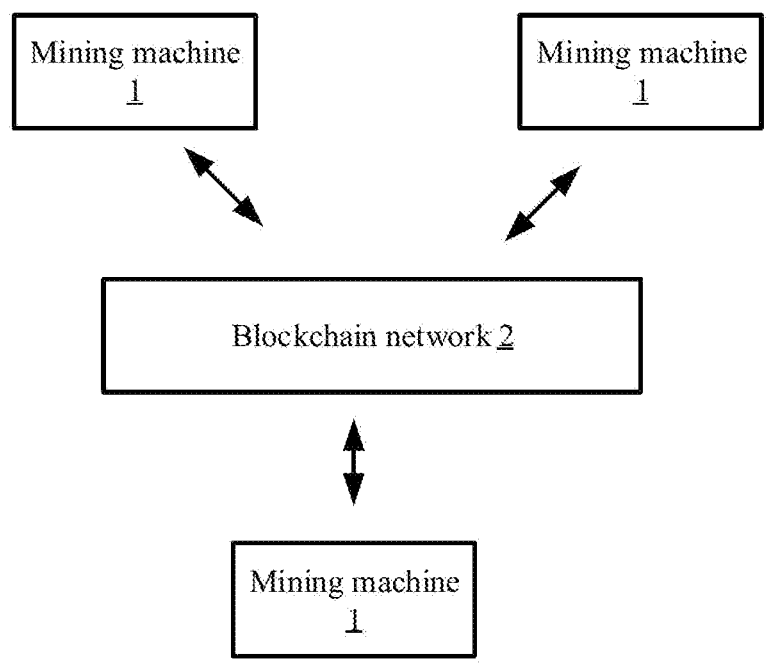
FIG. 1 illustrates architecture of an application environment in which a method for limiting a computing power of a mining machine is applicable.

FIG. 1 illustrates application environment in which a method for limiting a computing power of a mining machine applies.

In the embodiment, the method of limiting the computing power of the mining machine is applied to an environment which includes a plurality of mining machines 1 (three mining machines are shown in FIG. 1 for example) and a blockchain network 2.

In this embodiment, the mining machine 1 can be a professional mining machine, a home computer, a smart phone, a server, a smart router, a smart watch, a smart TV, and the like.

It should be noted that the application environment of the method for limiting the computing power of the mining machine shown in FIG. 1 of the present embodiment is merely illustrative and should not be construed as limiting the present disclosure.

Figure 2:
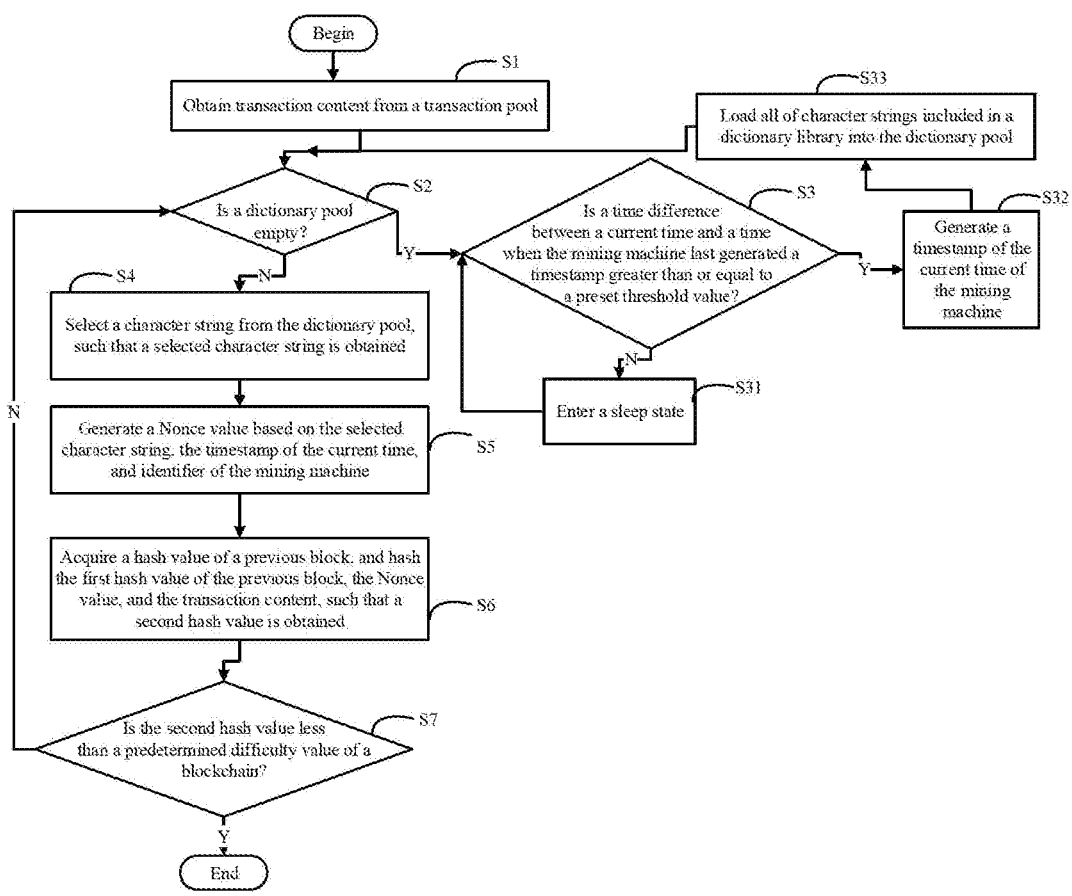
FIG. 2 illustrates one embodiment of a flowchart of a method for limiting computing power of a mining machine.

FIG. 2 shows a flow chart of one embodiment of a method for limiting computing power of a mining machine of the present disclosure.

In one embodiment, the method for limiting computing power of the mining machine can be applied to the mining machine 1. For the mining machine 1 that needs to perform a method for limiting computing power, the function for limiting computing power provided by the method of the present disclosure can be directly integrated on the mining machine 1, or run on the mining machine 1 in the form of a software development kit (SDK).

Block S1: the mining machine 1 obtains transaction content from a transaction pool.

In the embodiment, the transaction content can be a transaction record that has not been sent to a blockchain.

In the embodiment, the transaction pool stores the transaction record of a current billing cycle. The transaction record can include, but is not limited to, transaction amount, identity information of transaction parties, transaction time, and other information related to a current transaction, and instructions for executing a smart contract.

In the embodiment, the transaction content obtained from the transaction pool can include, but is not limited to, the transaction amount and the instructions for executing the smart contract.

It should be noted that the smart contract is a computer protocol intended to digitally facilitate, verify, or enforce a negotiation or performance of a contract. Smart contracts allow the performance of credible transactions without third parties. These transactions are trackable and irreversible.

Block S2: When the transaction content is obtained from the transaction pool, the mining machine 1 determines whether a dictionary pool is empty. In other words, the mining machine 1 determines whether or not the dictionary pool does not include any character string. When the dictionary pool is empty, the process goes to block S3. If the dictionary pool is not empty, the process goes to block S4.

Block S3: When the dictionary pool is empty, the mining machine 1 calculates time difference between a current time and a time when the mining machine 1 last generated a timestamp. The mining machine 1 further can determine whether the time difference is greater than or equal to a preset threshold value. When the time difference is less than the preset threshold value, the process goes to block S31. When the time difference is greater than or equal to the preset threshold value, the process goes to block S32.

In the embodiment, the current time can be system time of the mining machine 1.

In the embodiment, the preset threshold value can be 0.5 millisecond or 1 millisecond.

In the embodiment, the timestamp refers to a total number of seconds calculated begin from start time to the current time. The start time is Jan. 1, 1970, 00:00:00 of Greenwich Mean Time (GMT) or the start time is Jan. 1, 1970, 08:00:00 of Beijing time. It should be noted that, when the start time is Jan. 1, 1970, 00:00:00 of GMT, the current time is in a form of GMT. When the start time is Jan. 1, 1970, 08:00:00 of Beijing time, the current time is in a form of Beijing time.

In this embodiment, the dictionary pool refers to a storage device of the mining machine 1 for temporarily storing character strings. It should be noted that, when the mining machine 1 has not generated any timestamp, i.e., when block S3 is performed for a first time, the mining machine 1 can assume that the time difference is greater than the preset threshold value.

Block S31: When the time difference is less than the preset threshold value, the mining machine 1 enters a sleep state.

In one embodiment, when the time difference is less than the preset threshold value, the mining machine 1 estimates a sleep time length of the mining machine 1 before the mining machine 1 enters the sleep state. The sleep time length can be defined to be time length of the mining machine 1 in sleep state.

In the embodiment, the sleep time length is equal to a difference value between the preset threshold value and the time difference. The mining machine 1 sets a wake-up time based on the sleep time length and a current time of the mining machine 1. The mining machine 1 wakes up at the wake-up time. Thereby, a function of automatically waking up the mine machine 1 is achieved.

In this embodiment, the wake-up time is equal to a sum of the current time of the mining machine 1 and the sleep time length.

For example, the current time of the mining machine 1 is 8:30, and the sleep time length is equal to 5 seconds, then the wake-up time will be 8:35.

In this embodiment, when the mining machine 1 wakes up from the sleep state, the process returns to the block S3, such that the mining machine 1 continues to calculate the time difference between the time when the mining machine 1 last generated the timestamp and the current time of the mining machine 1. The mining machine 1 continues to determine whether the time difference is greater than or equal to the preset threshold value.

Block S32: When the time difference is greater than or equal to the preset threshold value, the mining machine 1 generates a timestamp of the current time of the mining machine 1. The mining machine 1 further sets a relationship between the current time of the mining machine 1 and the timestamp. The mining machine 1 sets the current time corresponding to the timestamp as generating time of the timestamp. The generating time of the timestamp can be defined to be time of the mining machine 1 when the timestamp is generated.

In one embodiment, the mining machine 1 also stores the timestamp of the current time and the generating time of the timestamp to a storage device.

In one embodiment, when the mining machine 1 needs to acquire generating time of the mining machine 1 last generated the timestamp at block S3, the mining machine 1 can obtain the generating time based on the last generated timestamp from the storage device, and the mining machine 1 can calculate the time difference using the generating time and the current system time of the mining machine 1. In other words, the time difference is a difference between the generating time and the current system time of the mining machine 1.

Block S33: The mining machine 1 loads all of character strings included in a dictionary library into the dictionary pool.

In this embodiment, the dictionary library can be a database included in the mining machine 1 or can be a cloud storage device that communicates with the mining machine 1, the cloud storage device stores the character strings.

In one embodiment, the character strings included in the dictionary library and a total number of the character strings can be fixed. In other words, the number of character strings included in the dictionary library is preset.

Block S4: When the dictionary pool is not empty, the mining machine 1 selects a character string from the dictionary pool, such that a selected character string is obtained.

In one embodiment, the mining machine 1 removes the selected character string from the dictionary pool.

In one embodiment, the mining machine 1 can randomly select the character string from all of the character strings included in the dictionary pool. In other words, the selected character string is the character string that is randomly selected by the mining machine 1.

Block S5: the mining machine 1 generates a Nonce value based on the selected character string, the timestamp of the current time, and an identifier of the mining machine 1.

In one embodiment, the identifier of the mining machine 1 can be a MAC (Media Address Control) address of the mining machine 1.

In one embodiment, the mining machine 1 can generate the Nonce value by combining the selected character string, the timestamp of the current time, and the identifier of the mining machine 1 according to a preset rule.

In an embodiment, the preset rule can be defined to be connecting the timestamp of the current time to the identifier of the mining machine 1, and connecting the selected character string to the timestamp of the current time.

In other embodiments, the preset rule can be defined to be connecting the selected character string to the identifier of the mining machine 1, and connecting the timestamp of the current time to the selected character string.

For example, the identifier of the mining machine 1 is c8:1f:66:3b:a8:e3, the timestamp of the current time is 1551060597367, and the selected character string is CAPPUCCINO. If the preset rule is defined to be connecting the timestamp of the current time to the identifier of the mining machine 1, and connecting the selected character string to the timestamp of the current time, the Nonce value is c8:1f:66:3b:a8:e3 1551060597367 CAPPUCCINO. If the preset rule is defined to be connecting the selected character string to the identifier of the mining machine 1, and connecting the timestamp of the current time to the selected character string, then the Nonce value is c8:1f:66:3b:a8:e3 CAPPUCCINO 1551060597367.

Block S6: The mining machine 1 acquires a hash value of a previous block. To clearly describe the disclosure, the hash value of the previous block is named as "first hash value". The mining machine 1 hashes the first hash value of the previous block, the Nonce value, and the transaction content, such that a second hash value is obtained.

In this embodiment, the mining machine 1 obtains the first hash value of the previous block from the blockchain network 2. The previous block is a block of the blockchain that was last generated (i.e., generated most recently).

Block S7: The mining machine 1 determines whether the second hash value is less than a predetermined difficulty value of the blockchain. When the second hash value is less than the predetermined difficulty value of the blockchain, the mining machine 1 determines that mining is successful, accordingly, a block produced by the mining machine 1 can be uploaded for insertion in the blockchain.

In this embodiment, when the mining machine 1 mines successfully, the mining machine 1 also stores the second hash value.

When the second hash value is greater than or equal to the predetermined difficulty value of the blockchain, the mining machine 1 determines that mining is unsuccessful, and the process returns to block S2. Then the mining machine 1 re-acquires the character string from the dictionary pool and recalculates a new Nonce value.

It can be seen from the above processes, the present disclosure utilizes a dictionary library and a timestamp to control Nonce combination that can be tried per unit time. Even if all character strings in the dictionary library have been tried, as long as the time difference between time of last generating the timestamp and current time has not exceeded the preset threshold value, the mining machine needs to wait in sleep state and cannot re-mine until the time difference is greater than or equal to the preset threshold value. Thus a situation of computing power of the mining machine being too strong and causing a monopoly of computing power is avoided. In other words, the present disclosure can limit the computing power of the mining machine.

Figure 3:
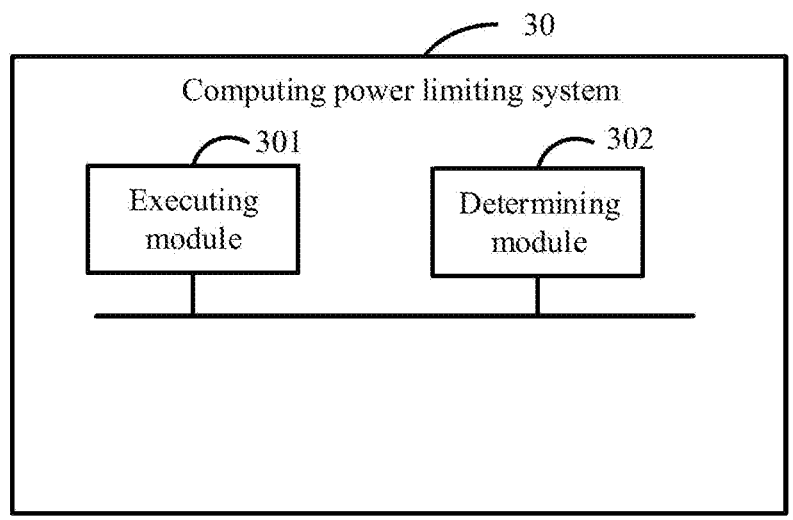
FIG. 3 shows one embodiment of modules of a computing power limiting system of the present disclosure.

FIG. 3 shows an embodiment of modules of a computing power limiting system of the present disclosure.

In some embodiments, the computing power limiting system 30 runs in the mining machine 1. The computing power limiting system 30 can include a plurality of modules. The plurality of modules can comprise computerized instructions in a form of one or more computer-readable programs that can be stored in a non-transitory computer-readable medium (e.g., a storage device of the mining machine 1), and executed by at least one processor of the mining machine 1 to implement computing power limiting function (described in detail in FIG. 2).

In at least one embodiment, the computing power limiting system 30 can include a plurality of modules. The plurality of modules can include, but is not limited to, an executing module 301 and a determining module 302. The modules 310-302 can comprise computerized instructions in the form of one or more computer-readable programs that can be stored in the non-transitory computer-readable medium (e.g., the storage device of the mining machine 1), and executed by the at least one processor of the mining machine 1 to implement computing power limiting function (e.g., described in detail in FIG. 2).

The executing module 301 obtains transaction content from a transaction pool.

In the embodiment, the transaction content can be a transaction record that has not been sent to a blockchain.

In the embodiment, the transaction pool stores the transaction record of a current billing cycle. The transaction record can include, but is not limited to, transaction amount, identity information of transaction parties, transaction time, and other information related to a current transaction, and instructions for executing a smart contract.

In the embodiment, the transaction content obtained from the transaction pool can include, but is not limited to, the transaction amount and the instructions for executing the smart contract.

It should be noted that the smart contract is a computer protocol intended to digitally facilitate, verify, or enforce a negotiation or performance of a contract. Smart contracts allow the performance of credible transactions without third parties. These transactions are trackable and irreversible.

When the transaction content is obtained from the transaction pool, the determining module 302 determines whether a dictionary pool is empty. In other words, the determining module 302 determines whether or not the dictionary pool does not include any character string.

When the dictionary pool is empty, the executing module 301 calculates time difference between a current time and a time when the executing module 301 last generated a timestamp. The executing module 301 further can determine whether the time difference is greater than or equal to a preset threshold value.

In the embodiment, the current time can be system time of the mining machine 1.

In the embodiment, the preset threshold value can be 0.5 millisecond or 1 millisecond.

In the embodiment, the timestamp refers to a total number of seconds calculated begin from start time to the current time. The start time is Jan. 1, 1970, 00:00:00 of GMT or the start time is Jan. 1, 1970, 08:00:00 of Beijing time. It should be noted that, when the start time is Jan. 1, 1970, 00:00:00 GMT, the current time is in a form of GMT. When the start time is Jan. 1, 1970, 08:00:00 of Beijing time, the current time is in a form of Beijing time.

In this embodiment, the dictionary pool refers to a storage device of the mining machine 1 for temporarily storing character strings. It should be noted that, when the executing module 301 has not generated any timestamp, the executing module 301 can assume that the time difference is greater than the preset threshold value.

When the time difference is less than the preset threshold value, the executing module 301 controls the mining machine 1 to enter a sleep state.

In one embodiment, when the time difference is less than the preset threshold value, the executing module 301 estimates a sleep time length of the mining machine 1 before controlling the mining machine 1 to enter the sleep state. The sleep time length can be defined to be length of time that the mining machine 1 is in sleep state.

In the embodiment, the sleep time length is equal to a difference value between the preset threshold value and the time difference. The executing module 301 sets wake-up time based on the sleep time length and a current time of the mining machine 1. The executing module 301 wakes up the mining machine 1 at the wake-up time. Thereby, a function of automatically waking up the mine machine 1 is achieved.

In this embodiment, the wake-up time is equal to a sum of the current time of the mining machine 1 and the sleep time length.

For example, the current time of the mining machine 1 is 8:30, and the sleep time length is equal to 5 seconds, then the wake-up time will be 8:35.

In this embodiment, when the executing module 301 wakes up the mining machine 1 from the sleep state, the executing module 301 continues to calculate the time difference between the time when the executing module 301 last generated the timestamp and the current time of the mining machine 1. The executing module 301 continues to determine whether the time difference is greater than or equal to the preset threshold value.

When the time difference is greater than or equal to the preset threshold value, the executing module 301 generates a timestamp of the current time of the mining machine 1.

The executing module 301 further sets a relationship between the current time of the mining machine 1 and the timestamp. The executing module 301 sets the current time corresponding to the timestamp as generating time of the timestamp. The generating time of the timestamp can be defined to be time that the executing module 301 generates the timestamp.

In one embodiment, the executing module 301 also stores the timestamp of the current time and the generating time of the timestamp to a storage device.

In one embodiment, when the executing module 301 needs to acquire generating time of the executing module 301 last generated the timestamp, the executing module 301 can obtain the generating time based on the last generated timestamp from the storage device, and the executing module 301 can calculate the time difference using the generating time and the current system time of the mining machine 1. In other words, the time difference is a difference between the generating time and the current system time of the mining machine 1.

The executing module 301 loads all of character strings included in a dictionary library into the dictionary pool.

In this embodiment, the dictionary library can be a database included in the mining machine 1 or can be a cloud storage device that communicates with the mining machine 1, the cloud storage device stores the character strings.

In one embodiment, the character strings included in the dictionary library and a total number of the character strings can be fixed. In other words, the number of character strings included in the dictionary library is preset.

If the dictionary pool is not empty, the executing module 301 selects a character string from the dictionary pool, such that a selected character string is obtained.

In one embodiment, the executing module 301 removes the selected character string from the dictionary pool.

In one embodiment, the executing module 301 can randomly select the character string from all of the character strings included in the dictionary pool. In other words, the selected character string is the character string that is randomly selected by the executing module 301.

The executing module 301 generates a Nonce value based on the selected character string, the timestamp of the current time, and an identifier of the mining machine 1.

In one embodiment, the identifier of the mining machine 1 can be a MAC address of the mining machine 1.

In one embodiment, the executing module 301 can generate the Nonce value by combining the selected character string, the timestamp of the current time, and the identifier of the mining machine 1 according to a preset rule.

In an embodiment, the preset rule can be defined to be connecting the timestamp of the current time to the identifier of the mining machine 1, and connecting the selected character string to the timestamp of the current time.

In other embodiments, the preset rule can be defined to be connecting the selected character string to the identifier of the mining machine 1, and connecting the timestamp of the current time to the selected character string.

For example, the identifier of the mining machine 1 is c8:1f:66:3b:a8:e3, the timestamp of the current time is 1551060597367, and the selected character string is CAPPUCCINO. If the preset rule is defined to be connecting the timestamp of the current time to the identifier of the mining machine 1, and connecting the selected character string to the timestamp of the current time, the Nonce value is c8:1f:66:3b:a8:e3 1551060597367 CAPPUCCINO. If the preset rule is defined to be connecting the selected character string to the identifier of the mining machine 1, and connecting the timestamp of the current time to the selected character string, then the Nonce value is c8:1f:66:3b:a8:e3 CAPPUCCINO 1551060597367.

The executing module 301 acquires a hash value of a previous block. To clearly describe the disclosure, the hash value of the previous block is named as "first hash value". The executing module 301 hashes the first hash value of the previous block, the Nonce value, and the transaction content, such that a second hash value is obtained.

In this embodiment, the executing module 301 obtains the first hash value of the previous block from the blockchain network 2. The previous block is a block of the blockchain that was last generated (i.e., generated most recently).

The executing module 301 determines whether the second hash value is less than a predetermined difficulty value of the blockchain. When the second hash value is less than the predetermined difficulty value of the blockchain, the executing module 301 determines that the mining machine 1 is mined successfully, accordingly, a block produced by the mining machine 1 can be uploaded to the blockchain for storage.

In this embodiment, when the mining machine 1 is mined successfully, the executing module 301 also stores the second hash value.

When the second hash value is greater than or equal to the predetermined difficulty value of the blockchain, the executing module 301 determines that the mining machine 1 is mined unsuccessfully. Then the executing module 301 re-acquires the character string from the dictionary pool and recalculate a new Nonce value.

The power computing limiting system utilizes a dictionary library and a timestamp to control Nonce combination that can be tried per unit time. Even if all character strings in the dictionary library have been tried, as long as the time difference between time of last generating the timestamp and current time has not exceeded the preset threshold value, the mining machine needs to wait in sleep state and cannot re-mine until the time difference is greater than or equal to the preset threshold value. Thus situation is avoided that computing power of the mining machine is too strong and cause a monopoly of the computing power. In other words, the present disclosure can limit the computing power of the mining machine.

Figure 4:
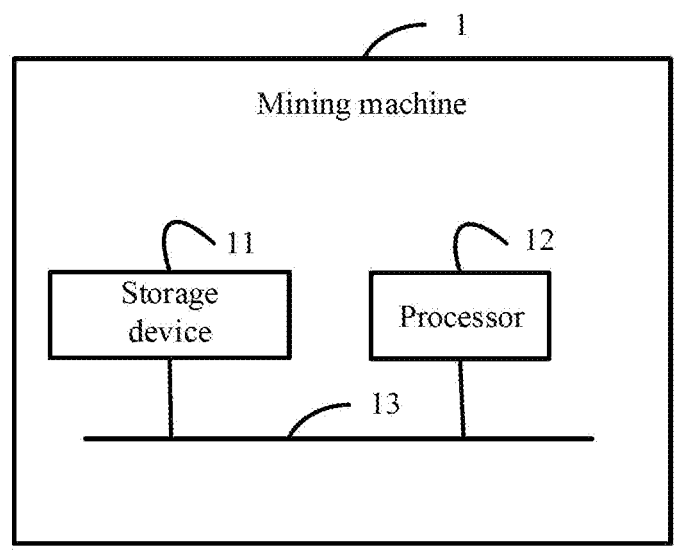
FIG. 4 shows one embodiment of a schematic structural diagram of a mining machine of the present disclosure.

FIG. 4 shows one embodiment of a schematic structural diagram of a mining machine. In an embodiment, a mining machine 1 includes a storage device 11, at least one processor 12, and at least one bus 13. In this embodiment, the mining machine 1 can be a professional mining machine, a home computer, a smart phone, a server, a smart router, a smart watch, a smart TV, and the like.

It should be understood by those skilled in the art that the structure of the mining machine 1 shown in FIG. 4 does not constitute a limitation of the embodiment of the present disclosure. Other examples of mining machine 1 may have a bus type structure or a star type structure, and may further include other hardware or software, or may have different component arrangements.

In at least one embodiment, the mining machine 1 can include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the mining machine 1 is merely an example, and existing or future electronic products may be included in other examples and thus the scope of the present disclosure, and are included in the reference.

In some embodiments, the storage device 11 can be used to store program codes of computer readable programs and various data, such as the computing power limiting system 30 installed in the mining machine 1, and automatically access to the programs or data with high speed during running of the mining machine 1. The storage device 11 can include a read-only memory (ROM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the mining machine 1 that can be used to carry or store data.

In some embodiments, the at least one processor 12 may be composed of an integrated circuit, for example, may be composed of a single packaged integrated circuit, or may be composed of multiple integrated circuits of same function or different functions. The at least one processor 12 can include one or more central processing units (CPU), a microprocessor, a digital processing chip, a graphics processor, and various control chips. The at least one processor 12 is a control unit of the mining machine 1, which connects various components of the mining machine 1 using various interfaces and lines. By running or executing a computer program or modules stored in the storage device 11, and by invoking the data stored in the storage device 11, the at least one processor 12 can perform various functions of the mining machine 1 and process data of the mining machine 1. For example, the function of performing the computing power limiting.

In some embodiments, the bus 13 is used to achieve communication between the storage device 11 and the at least one processor 12, and other components of the mining machine 1.

Although not shown, the mining machine 1 may further include a power supply (such as a battery) for powering various components. Preferably, the power supply may be logically connected to the at least one processor 12 through a power management device, thereby, the power management device manages functions such as charging, discharging, and power management. The power supply may include one or more a DC or AC power source, a recharging device, a power failure detection circuit, a power converter or inverter, a power status indicator, and the like. The mining machine 1 may further include various items, such as a BLUETOOTH module, a WI-FI module, and the like, and details are not described herein.

In at least one embodiment, as shown in FIG. 3, the at least one processor 12 can execute various types of applications (such as the computing power limiting system 30) installed in the mining machine 1, program codes, and the like. For example, the at least one processor 12 can execute the modules 301-302 of the computing power limiting system 30.

In at least one embodiment, the storage device 11 stores program codes. The at least one processor 12 can invoke the program codes stored in the storage device to perform functions. For example, the modules described in FIG. 3 are program codes stored in the storage device 11 and executed by the at least one processor 12, to implement the functions of the various modules for the purpose of limiting computing power of the mining machine 1.

In at least one embodiment, the storage device 11 stores one or more instructions (i.e., at least one instruction) that are executed by the at least one processor 12 to achieve the purpose of limiting computing power of the mining machine 1.

In at least one embodiment, the at least one processor 12 can execute the at least one instruction stored in the storage device 11 to perform the operations shown in FIG. 2.

The steps in the method of the embodiments of the present disclosure may be sequentially adjusted, merged, and deleted according to actual needs.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method for limiting computing power applicable to a mining machine, the method comprising:
   obtaining transaction content from a transaction pool;
   calculating, when a dictionary pool is empty, time difference between a current time and a time when the mining machine last generated a timestamp;
   generating a timestamp of the current time when the time difference is greater than or equal to a preset threshold value;
   loading all character strings in a dictionary library into the dictionary pool when the timestamp of the current time is generated;
   selecting and obtaining a character string from the dictionary pool when the dictionary pool is not empty;
   generating a Nonce value based on the selected character string, the timestamp of the current time, and an identifier of the mining machine;
   acquiring a first hash value of a previous block of a blockchain;
   hashing the first hash value of the previous block, the Nonce value, and the transaction content, such that a second hash value is obtained;
   determining the mining machine is mined successfully when the second hash value is less than a predetermined difficulty value; and
   determining the mining machine is mined unsuccessfully when the second hash value is greater than or equal to the predetermined difficulty value.

2. The method according to claim 1, wherein the transaction content obtained from the transaction pool comprises transaction amount and instructions for executing a smart contract.

3. The method according to claim 1, further comprises:
   controlling the mining machine to enter a sleep state when the time difference is less than the preset threshold value.

4. The method according to claim 3, further comprising:
   estimating a sleeping time length of the mining machine before controlling the mining machine to enter the sleep state, wherein the sleeping time length is equal to a difference value between the preset threshold value and the time difference;
   setting wake-up time based on the sleeping time length and the current time of the mining machine; and
   waking up the mining machine at the wake-up time.

5. The method according to claim 1, the method of generating the Nonce value comprising:

combining the selected character string, the timestamp of the current time, and the identifier of the mining machine according to a preset rule.

6. The method according to claim 5, wherein the preset rule comprises:
connecting the timestamp of the current time to the identifier of the mining machine; and
connecting the selected character string to the timestamp of the current time.

7. The method according to claim 5, wherein the preset rule comprising:
connecting the selected character string to the identifier of the mining machine; and
connecting the timestamp of the current time to the selected character string.

8. A mining machine comprising:
a storage device;
at least one processor; and
the storage device storing one or more programs, which when executed by the at least one processor, cause the at least one processor to:
obtain transaction content from a transaction pool;
calculate, when a dictionary pool is empty, time difference between a current time and a time when the mining machine last generated a timestamp;
generate a timestamp of the current time when the time difference is greater than or equal to a preset threshold value;
load all character strings in a dictionary library into the dictionary pool when the timestamp of the current time is generated;
select and obtain a character string from the dictionary pool when the dictionary pool is not empty;
generate a Nonce value based on the selected character string, the timestamp of the current time, and an identifier of the mining machine;
acquire a first hash value of a previous block of a blockchain;
hash the first hash value of the previous block, the Nonce value, and the transaction content, such that a second hash value is obtained;
determine the mining machine is mined successfully when the second hash value is less than a predetermined difficulty value; and
determine the mining machine is mined unsuccessfully when the second hash value is greater than or equal to the predetermined difficulty value.

9. The mining machine according to claim 8, wherein the transaction content obtained from the transaction pool comprises transaction amount and instructions for executing a smart contract.

10. The mining machine according to claim 8, wherein the at least one processor is further caused to:
control the mining machine to enter a sleep state when the time difference is less than the preset threshold value.

11. The mining machine according to claim 10, wherein the at least one processor is further caused to:
estimate a sleeping time length of the mining machine before controlling the mining machine to enter the sleep state, wherein the sleeping time length is equal to a difference value between the preset threshold value and the time difference;
set wake-up time based on the sleeping time length and the current time of the mining machine; and
wake up the mining machine at the wake-up time.

12. The mining machine according to claim 8, wherein the at least one processor is further caused to:
generate the Nonce value by combining the selected character string, the timestamp of the current time, and the identifier of the mining machine according to a preset rule.

13. The mining machine according to claim 12, wherein the preset rule comprises:
connecting the timestamp of the current time to the identifier of the mining machine; and
connecting the selected character string to the timestamp of the current time.

14. The mining machine according to claim 12, wherein the preset rule comprises:
connecting the selected character string to the identifier of the mining machine; and
connecting the timestamp of the current time to the selected character string.

15. A non-transitory storage medium having instructions stored thereon, when the instructions are executed by a processor of a mining machine, the processor is configured to perform a method of limiting computing power of the mining machine, wherein the method comprises:
obtaining transaction content from a transaction pool;
calculating, when a dictionary pool is empty, time difference between a current time and a time when the mining machine last generated a timestamp;
generating a timestamp of the current time when the time difference is greater than or equal to a preset threshold value;
loading all character strings in a dictionary library into the dictionary pool when the timestamp of the current time is generated;
selecting and obtaining a character string from the dictionary pool when the dictionary pool is not empty;
generating a Nonce value based on the selected character string, the timestamp of the current time, and an identifier of the mining machine;
acquiring a first hash value of a previous block of a blockchain;
hashing the first hash value of the previous block, the Nonce value, and the transaction content, such that a second hash value is obtained;
determining the mining machine is mined successfully when the second hash value is less than a predetermined difficulty value; and
determining the mining machine is mined unsuccessfully when the second hash value is greater than or equal to the predetermined difficulty value.

16. The non-transitory storage medium according to claim 15, wherein the transaction content obtained from the transaction pool comprises transaction amount and instructions for executing a smart contract.

17. The non-transitory storage medium according to claim 15, wherein the method further comprises:
controlling the mining machine to enter a sleep state when the time difference is less than the preset threshold value.

18. The non-transitory storage medium according to claim 17, wherein the method further comprises:
estimating a sleeping time length of the mining machine before controlling the mining machine to enter the sleep state, wherein the sleeping time length is equal to a difference value between the preset threshold value and the time difference;
setting wake-up time based on the sleeping time length and the current time of the mining machine; and
waking up the mining machine at the wake-up time.

19. The non-transitory storage medium according to claim 15, wherein the method of generating the Nonce value comprises:
   combining the selected character string, the timestamp of the current time, and the identifier of the mining machine according to a preset rule.

20. The non-transitory storage medium according to claim 19, wherein the preset rule comprises:
   connecting the timestamp of the current time to the identifier of the mining machine; and
   connecting the selected character string to the timestamp of the current time;
   or the preset rule comprises:
   connecting the selected character string to the identifier of the mining machine; and
   connecting the timestamp of the current time to the selected character string.

* * * * *